United States Patent [19]

Hilburger

[11] 3,851,398

[45] Dec. 3, 1974

[54] GEAR TEST APPARATUS

[75] Inventor: Walter Hilburger, Nurtingen, Germany

[73] Assignee: Metabowerke KG Class, Rauch & Schnizler, Nurtingen, Wurttemberg, Germany

[22] Filed: Mar. 5, 1973

[21] Appl. No.: 338,015

[30] Foreign Application Priority Data

Mar. 7, 1972 Germany.............................. 2210881

[52] U.S. Cl. .............................. 33/179.5 B, 73/162
[51] Int. Cl. ......................... G01b 5/20, G01b 7/26
[58] Field of Search ................... 73/162; 33/179.5 B; 324/34 GT

[56] References Cited

UNITED STATES PATENTS

| | | | |
|---|---|---|---|
| 2,855,691 | 10/1958 | Cunningham ................... | 33/179.5 C |
| 3,064,809 | 11/1962 | Anthony .............................. | 73/162 |
| 3,231,813 | 1/1966 | Vanator ......................... | 33/179.5 R |
| 3,712,130 | 1/1973 | Weichbrodt .......................... | 73/162 |

*Primary Examiner*—S. Clement Swisher
*Attorney, Agent, or Firm*—Michael S. Striker

[57] ABSTRACT

The movement of a carriage along a predetermined path is a function of gear errors in a gear under test. A first sensor furnishes a signal which is directly proportional to the distance moved by the carriage. A second sensor furnishes a signal whenever a gear tooth passes by a predetermined location. First and second analog storage means each have a first input connected to the first sensing means and furnish signals corresponding to the peak-to-peak variation of the signals applied at the input. The first analog storage means is reset by the signal from the second sensor, that is it furnishes a tooth-to-tooth error signal. The second analog storage means is reset after a complete revolution, that is it furnishes a signal corresponding to the total composite error. Further, an amplifier is furnished whose input is directly connected to the output of the first sensor. The stored signals in the analog storages and the amplifier output signal are individually compared to predetermined limiting values in separate comparators each of which furnishes an output signal when its limit is exceeded. A flip-flop connected to the output of each comparator flips in response to the comparator output signal, thereby lighting a corresponding lamp which indicates a particular type of error.

13 Claims, 1 Drawing Figure

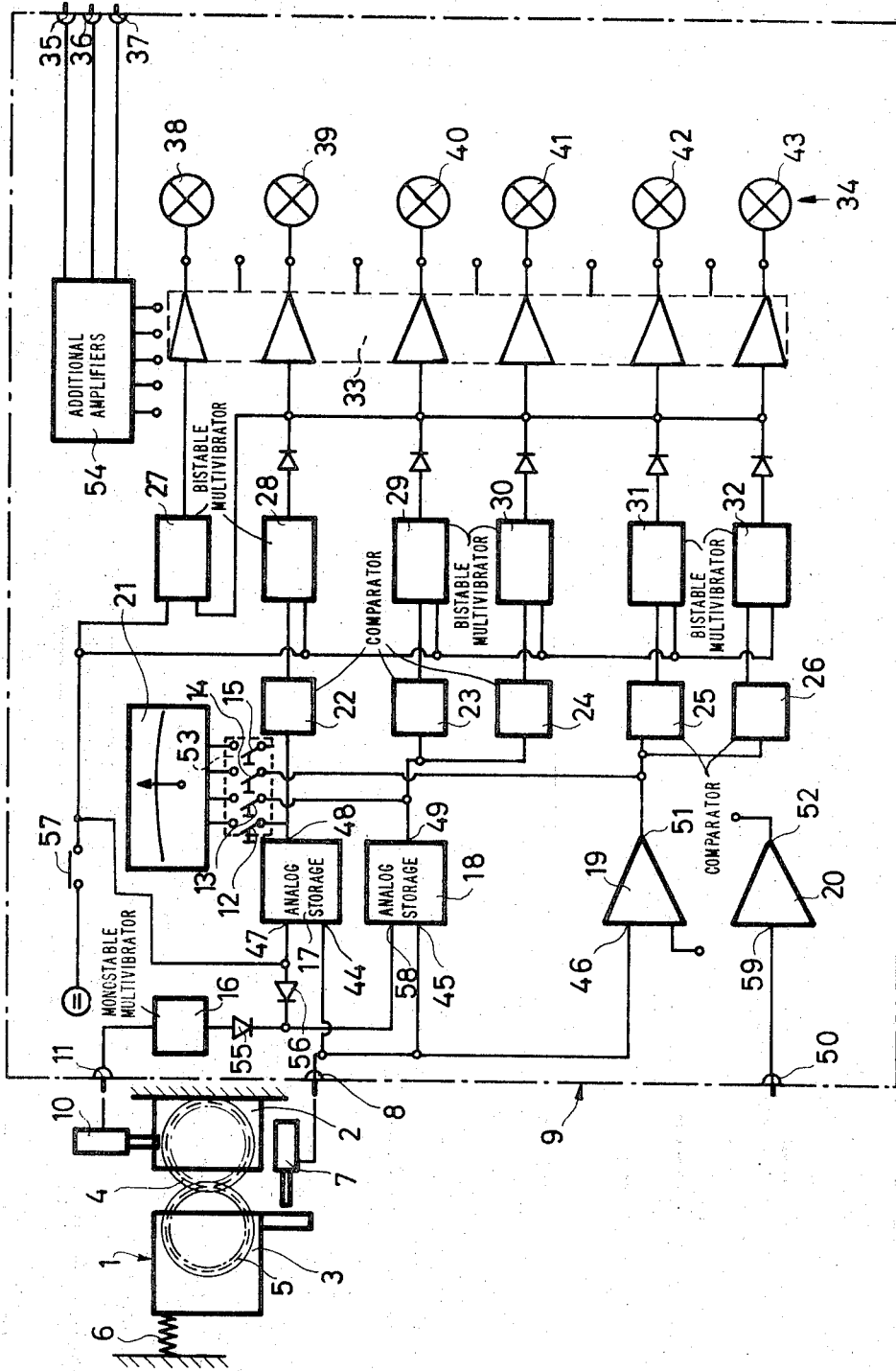

GEAR TEST APPARATUS

BACKGROUND OF THE INVENTION

This invention relates to gear test apparatus and in particular to gear test apparatus wherein two gears are meshed, rotated relative to one another and the lateral movement of the gears relative to each other is measured. Specifically, generally the one gear is a gear under test while the other is a master gear whose errors are sufficiently small relative to errors in the gear under test as to be considered negligible. Further, one of the gears is generally mounted in a stationary position as far as lateral movement is concerned, while the other gear is mounted on a movable carriage. Normally the master gear is mounted on the movable carriage.

In known test apparatus of the above-described type, an indicator instrument is used to indicate the movement of the carriage. Of course the movement of the carriage can also be recorded. From such a recording the total composite error which is the largest amplitude occurring during a complete rotation and which includes the error due to eccentricity of the pitch circle as well as the tooth-to-tooth error, can be determined. Further, the tooth-to-tooth error which includes the errors due to inaccuracies in the tooth thickness as well as profile errors and errors in the degrees of arc occupied by each tooth may be determined as the maximum amplitudes variation within that portion of the pitch circle circumference allocated to one tooth.

Further, apparatus is known wherein instead of an analog recording, an automatic sorting takes place, separately for the total composite error and the tooth-to-tooth error. In these known arrangements the variations in the distances between the gear axes of the two gears are sensed and are transferred to a control arrangement which converts it to electrical signals. These electrical signals are demodulated to furnish a D.C. voltage, the voltages being so filtered that the tooth-to-tooth error signal is separated from the total composite error signal. This type of filtering has various disadvantages. First it requires a good deal of equipment. Secondly of course the operation of the filters varies as a function of frequency and, therefore, separate filters must be used for each particular gear being tested. The filters must be exchanged when the modulus, the number of teeth or the rotational speed of the gear under test are changed, since the tooth frequency, that is the number of teeth per second must remain relatively constant. This of course means that a good deal of spares must be kept in reserve and that time must be spent in altering the equipment for the particular test. The filter in question becomes especially difficult when sliding gears, pinion gears or bevel gears are used since the different number of gear teeth operate at the same rotational frequency. Under certain conditions it is even necessary to use a motor which has a regulatable rotational speed and which of course is particular expensive in order to drive the gears.

SUMMARY OF THE INVENTION

It is an object of the present invention to furnish gear test apparatus which is universally applicable and does not require that particular input conditions be met. It is to be usable in different speed ranges and the use for both in the testing by hand that is at a very low rotational speed and through testing by motor driven rotation at very high speeds. The equipment is to operate independently of the modulus, the number of teeth and the rotational speed required for testing the gear. Multiple gearing arrangements are to be tested by similar apparatus simultaneously.

In addition to determining the gear errors, the tolerances in the pitch circle of the gear are to be determined also.

The present invention is used in gear testing apparatus having a sliding carriage movable in a predetermined direction, the movement of the sliding carriage being a function of gear errors. It comprises first sensing means for sensing said movement of said carriage and furnishing corresponding carriage movement signals. It further comprises sensing means for furnishing a second signal in response to passage of each gear tooth of the gear under test passed a predetermined location. First and second analog storage means are furnished each of which have a first input connected to the first sensing means for storing the carriage movement signal, the first analog storage means also having a reset input connected to the second sensing means. Further furnished is first amplifier means connected to the output of the first sensing means and a plurality of comparator means for comparing the outputs of said first and second analog storage means and said first amplifier means to corresponding limiting values and furnishing a comparator output signal when any of said outputs exceeds the corresponding limiting value. Further, a plurality of indicator means are furnished each of which indicates the presence of a corresponding one of the comparator output signals.

Each of the analog storage means stores a peak-to-peak signal indicative of the limits of carriage movement between sequential reset signals. Thus the first analog storage means stores a signal corresponding to the extremes of carriage movement per pitch distance, that is for the distance between corresponding points onto adjacent gear teeth. The second analog storage means of course furnishes a signal corresponding to the peak excursion of the carriage for a complete pitch circle circumference, that is for one rotation. It is obvious that this type of equipment works independently of the various parameters of the gear under test. Multiple gearing arrangements can of course be tested with identical equipment at the same time. The driving speed of the gears can be changed during the test without the introduction of errors. The equipment can be operated at the highest possible speed thus minimizing the time required for each test.

In a preferred embodiment of the invention both the first and second sensing means are contactless sensing means and, preferably, inductive sensing means. Thus the test results will in no way be influenced through changes in spring tension, changes in contact resistance, etc. Further of course the testing of gears can be completely automized.

It is an additional advantage that other outputs can readily be furnished which, in addition to the "go" and "no go" arrangement above allow connection of a measuring instrument or a recorder to the test arrangement.

If the equipment of the present invention is combined with automatic mounting and demounting equipment for the gears, the test can be carried out with a great saving of manpower. The comparator outputs can be used to activate sorters which separate unsatisfactory from satisfactory gears and which may even be used to mark a particular tooth found defective in a particular gear.

Further, in a preferred embodiment of the present invention, the source of power for the inductive sensors is derived from the same power source which also feeds the operational amplifiers, analog storages, etc.

In a further preferred embodiment of the present invention, the first analog storage means which has a first input which receives the signal from the first sensing means and which is reset by the signal from the second sensing means has a first and second comparator connected to its output. First and second digital storage means, namely flip-flops, are connected to the output of the first and second comparator means respectively. The limiting values in the two comparators are set to indicate the tooth-to-tooth error and possible tooth damage respectivley. Each of the comparator output signals is stored in one of the flip-flops and the corresponding flip-flop indication for the tooth damage can be used to activate the above-mentioned means for marking the tooth so that it can undergo subsequent repair and then be retested. Similarly, it can readily be determined by the use of two comparators connected to the output of the above-mentioned first amplifier means whether the pitch circle is too large and too small and corresponding indications can be furnished.

It is another advantage of the present invention that the apparatus can readily be used for measuring concentricity and for length measurement. Thus a single amplifier amplifying the output of the first sensing means can be used for measuring the diameter of shafts and bores as well as distances between members, thicknesses and depths and the concentricity can be determined independent of the diameter. Further, a second amplifier can be used which amplifies the signal furnished by the second sensing means. use of this second amplifier allows sum and difference measurements to be carried out during length measurements, so that the measurement of thickness, independent of the position of the test sample and of its shape as well as diameter measurements of shafts independent of their concentricity, tests for the parallel property of opposing surfaces, thickness measurements, independent of axial position, measurement of concentricity between two shaft diameters, ball bearing tests independent of diameter, angular measurements and measurements of play or negative clearance between shaft and bore independent of the absolute measurements thereof can be carried out.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE shows a block diagram of the apparatus of the present invention.

DESCRIPTION OF THE PREFERRED EMBODIMENTS

A preferred embodiment of the present invention will now be discussed with reference to the drawing. In FIG. 1, reference numeral 1 refers to a gear test apparatus designed to test both active surfaces of the gear. It has first stationary mounting means 2 and a movable carriage 3 which is mounted for movement relative to portion 2. For example the gear to be tested, 4, may be mounted in the mounting means 2 while a master gear 5 is mounted in the carriage 3. The master gear 5 is rotated while meshed with the test gear 4. Carriage 3 is connected to a fixed plane by means of a spring 6 and moves in correspondence with any gearing errors in a direction toward and away from gear 4. An inductive sensor 7, one embodiment of first sensing means, is furnished for sensing the movement of the carriage. Specifically, the inductive sensor 7 which is commercially available as a unit furnishes an output voltage which is linear with respect to the distance between the carriage and the face of inductive sensor 7 which is opposite said carriage. In these commercial units, the inductive sensor 7 comprises a coil which is situated at the above-mentioned face opposite the carriage and which constitutes a part of a high frequency oscillator. The output of the high frequency oscillator is damped to a lesser or greater extent depending on the relative distance between the carriage and the sensor. The output of the high frequency oscillator is fed to a demodulator and then through a low-pass filter. The signal at the output of the low-pass filter may be further amplified by a D.C. amplifier, the output of the D.C. amplifier then constituting what is herein referred to as the carriage movement signal, namely the output signal of the first sensing means.

In the system according to the present invention and as shown in the FIGURE, second sensing means 10 are provided. In a preferred embodiment of the present invention the sensing means are also inductive sensing means. The second sensing means furnish a signal whenever one of the teeth of the gear under test passes underneath, that is passed a predetermined location. The second signal, namely the signal furnished by the second sensing means 10 are applied to the overall control unit through a socket 11. The overall control arrangement 9 comprises a monostable multivibrator 16, a first and second analog storage arrangement 18 and 17, respectively, a first and second amplifier 19 and 20, respectively, an indicating instrument 21, five comparators 22–26, six digital storages 27–32, a set of amplifiers 33 and a lamp indicator arrangement 34. A further bank of amplifiers 54, may be connected to the output of amplifiers 33. The further bank of amplifiers 54 has signal outputs 35–37 signifying, respectively, "acceptable," "unacceptable," and "reworking required." The indicator lamp arrangement 34 has a green lamp 38 indicating "acceptable," a red lamp 39 for indicating an excessive total composite error, a red lamp 40 for indicating an excessive tooth-to-tooth error, a yellow lamp 41 for indication of damaged teeth which require a reworking, a yellow lamp 42 for indicating a pitch circle which is larger than a predetermined pitch circle and a red lamp 43 for indication of a pitch circle which is excessively small.

Specifically, the signal furnished at socket 8 is applied to the set inputs 44 and 45 of analog storages 17 and 18 and to the input 46 of the first amplifier 19. The signal received at socket 11, namely the output signal of the second sensor 10 is applied to the reset input 58 of analog storage 18 after passing through a monostable multivibrator 16 and a diode 55. The frequency of the signals at the input of monostable multivibrator 16 of course depends both upon the total number teeth of test gear 4 and on the rotational speed of this test gear. The output of monostable multivibrator 16 has a corresponding frequency but is a substantially rectangular signal. This signal, possibly after differentiation, is used to reset analog storage 18. Analog storages 17 and 18 have the identical construction except that the resetting of analog storage 18 takes place after each tooth passes under sensor 10, while analog storage 17 is only reset at the end of the complete cycle. Analog storage 18 comprises a positive peak rectifier and a negative peak rectifier for reference, see "Operational Amplifiers Design and Applications" by Gracme, Tobey and Huelsman, McGraw-Hill Book Co., FIG. 9.28, page 358, where terminal 45 is connected to the anode of D1 and terminal 58 to the RESET terminal, each having an input connected to input 45. The output of the positive peak rectifier and the output of the negative peak rectifier are applied, respectively, to the first and second input of a differential amplifier. The output of the differential amplifier thus corresponds to the peak-to-peak variation of the signal applied at input 45. See FIG. 9.29a, page 359 of same reference. As mentioned above, analog storage 17 is similarly constructed and the signal appearing at the output 48 also corresponds to the peak-to-peak amplitude of the signal applied at input 44. However, since analog storage 18 is reset after each pitch distance, that is after the distance between corresponding points on two adjacent gear teeth has been traversed, the output of analog storage 18 corresponds to the tooth-to-tooth error, while the output of analog storage 48 corresponds to the total composite error. The output 51 of amplifier 19 carries a signal which constitutes a measure of the deviation in pitch circle diameter of gear 4.

Each of the comparators 22–26 may be individually adjusted for comparing the signal applied at its input to a corresponding limiting value. If this limiting value is passed by the signal applied at its input, the comparator furnishes a signal which serves to set the corresponding one of storages 28–32. Digital storages 28–32 each are constituted by a single flip-flop having a set input connected to the output of the corresponding comparator and a reset input controlled by a switch 57 which will be discussed below. The flip-flop output, after amplification in amplifier bank 33, which, in a preferred embodiment, comprises a plurality of amplifiers each connected to a corresponding one of the outputs of digital storages 27–32 are utilized to energize a corresponding one of indicator lamps 38–43. The outputs of the amplifiers in amplifier bank 33 may also be used to energize the further amplifiers 54 when the apparatus of the present invention is used for other than gear testing.

It should further be noted that a diode is connected to the output of each of digital storages 28–32. These diodes symbolize a NOR-gate. Specifically, digital storage 27 is a flip-flop which is set when there is no output at any of the digital storages 28–32. Digital storage 27 is reset by means of the above-mentioned switch 57. Thus an indication is furnished on lamp 38 which is responsive to the set state of the flip-flop constituting digital storage 27 when no excessive gear errors have been registered in the remainder of the equipment.

It should be noted that in the preferred embodiment of the invention shown in the FIGURE, there are two comparators, namely comparator 23 and the comparator 24 connected to the output of analog storage 18. These are set individually in such a manner that comparator 24 furnishes an output signal indicative of tooth damage. This output signal serves to set the flip-flop constituting digital storage 30 and thereby causes a lighting of lamp 41. Further, as indicated by the output below lamp 41 in the FIGURE, the output of digital storage 30 may be used to control a control element which causes the damaged tooth to be marked. Thus if lamp 41 lights, a particular tooth is reworked after the testing is completed and the gear is then retested.

In case an indication of the actual measured values is desired, an indicator instrument 53 is connectable to the outputs 48 and 49 of analog storages 17 and 18, or, the outputs 51 and 52 of amplifiers 19 and 20 through activation of the corresponding contact of a selector switch 15. In this way a complete gear diagnosis can be carried out which includes a pitch circle diameter control and a control for possible tooth damage as well as controlling of the gear in accordance with predetermined tolerances such as, for example, specified in a particular specification.

It has been previously noted that the apparatus of the present invention, as well as being used for gear testing may also be used for concentricity and length measurements.

For concentricity measurements, sensor 7 is utilized. The signals derived from at least one complete rotation of the item under test are processed by analog storage 17, comparator 22, digital storages 27 and 28 and amplifiers 33. If the test sample is within specifications, lamp 38 will light or, if the additional amplifiers 54 are connected output 35 will furnish a signal indicating "acceptable." If the sampe is not within the predetermined tolerances, lamp 39 will light or, alternatively, output 36 will be energized, thus signalling an unacceptable test sample.

For individual length measurements sensor 7 may also be used. Its signal, amplified by amplifier 19 and evaluated in comparators 25 and 26 is used to control the state of digital storages 31 and 32, which in turn causes the energization of lamps 42 and 43 or the signal outputs 35 and 36 of the additional amplifiers 54. However, use of a second amplifier 20 allows operation in accordance with sum or difference measurements. For these measurements, output 52 of amplifier 20 is connected through corresponding comparators and digital storages with the amplifier bank 33. Input 59 of amplifier 20 is then connected through socket 50 to the output of sensor 10. While the above connections are not shown in the FIGURE, they are identical to those existing for example at the output of amplifier 19. A selector switch can then be provided which specifies whether an individual length measurement or a sum or difference measurement is to be carried out. Further, another selector switch may be provided which selects a suitable region of amplification.

Prior to each measurement a reset key 57 is pressed, which was mentioned above and which resets storages 17 and 18 as well as storages 27–32. A diode 56 is provided which allows application of the reset signal to input 58 of analog storage 18. This signal is blocked from monostable multivibrator 16 by diode 55.

In a preferred embodiment of the present invention the control unit 9 has readily accessible outputs over which the total composite error signal, the tooth-totooth error signal, the signal indicating the damaged tooth and the output signals of the amplifiers 19 and 20 are available for further processing by recorders, oscillographs, sorters or similar apparatus.

While the invention has been illustrated and described as embodied in particular sensing elements and storage and comparator means, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters patent is set forth in the appended claims:

1. In gear testing apparatus having a sliding carriage whose movement in a predetermined direction is a function of gear errors in the gear under test in combination, first sensing means for sensing said movement of said carriage and furnishing corresponding first signals; second sensing means for furnishing a second signal in response to passage of each gear tooth of said gear passed a predetermined location; first and second analog storage means each having an input connected to said first sensing means for storing said carriage movement signal, said first analog storage means further having a reset input connected to said second sensing means; first amplifier means connected to the output of said first sensing means; a plurality of comparator means for comparing the outputs of said first and second analog storage means and said first amplifier means to corresponding limiting values and furnishing a comparator output signal when any of said outputs passes the corresponding limiting value; and a plurality of indicator means each connected to a corresponding one of said comparator means for furnishing indications of said comparator output signals.

2. Apparatus as set forth in claim 1, further comprising digital storage means interconnected between each of said comparator means and the corresponding one of said indicator means, for storing said comparator output signals.

3. Apparatus as set forth in claim 2, wherein each of said digital storage means is a flip-flop.

4. Apparatus as set forth in claim 2, further comprising reset means for resetting said digital storage means and said second analog storage means at the end of a test cycle.

5. Apparatus as set forth in claim 1, wherein said first sensing means comprise contactless sensing means.

6. Apparatus as set forth in claim 5, wherein said first and second sensing means comprise inductive sensing means.

7. Apparatus as set forth in claim 6, further comprising a source of electrical energy for said apparatus; and wherein said inductive sensing means are connected to said source of electrical energy.

8. Apparatus as set forth in claim 1, wherein said plurality of comparator means comprise first and second comparator means connected to the output of said first analog storage means for furnishing, respectively, a first comparator output signal when the tooth-to-tooth error exceeds a predetermined tooth error and a second comparator output signal indicative of tooth damage.

9. Apparatus as set forth in claim 8, further comprising first and second digital storage means for storing, respectively, said first and second comparator output signals thereby furnishing first and second stored comparator output signals; and means responsive to said second stored comparator output signal for marking the damaged tooth.

10. Apparatus as set forth in claim 1, further comprising monostable multivibrator means connected between the output of said second sensing means and said reset input of said first analog storage means.

11. Apparatus as set forth in claim 1, wherein said plurality of indicator means comprise a plurality of lamps; further comprising measuring instrument means; and selector switch means for selectively connecting the output of said first or second analog storage means or of said first amplifier means to said measuring instrument means upon external activation.

12. Apparatus as set forth in claim 1, wherein said plurality of comparator means comprise first and second comparator means connected to the output of said first amplifier means, for, respectively, furnishing a first and second comparator output signal when the pitch circle diameter is, respectively, too large or too small.

13. Apparatus as set forth in claim 1, further comprising second amplifier means connected to the output of said second sensing means.

* * * * *